United States Patent
Duncan

(10) Patent No.: US 7,370,434 B2
(45) Date of Patent: May 13, 2008

(54) DRY KILN HEAT RETENTION SYSTEM

(75) Inventor: Marshall Duncan, Huntsville, TX (US)

(73) Assignee: Steely Lumber Company, Inc., Huntsville, TX (US)

( * ) Notice: Subject to any disclaimer, the term of this patent is extended or adjusted under 35 U.S.C. 154(b) by 0 days.

(21) Appl. No.: 11/361,953

(22) Filed: Feb. 24, 2006

(65) Prior Publication Data

US 2006/0191158 A1 Aug. 31, 2006

Related U.S. Application Data

(60) Provisional application No. 60/656,011, filed on Feb. 24, 2005.

(51) Int. Cl.
*F26B 19/00* (2006.01)

(52) U.S. Cl. .......................................... 34/218

(58) Field of Classification Search .................. 34/218
See application file for complete search history.

(56) References Cited

U.S. PATENT DOCUMENTS

| | | |
|---|---|---|
| 3,262,216 A | 7/1966 | Dugger |
| 4,017,254 A | 4/1977 | Jones |
| 4,026,037 A | 5/1977 | Bucholz |
| 4,307,519 A | 12/1981 | Szucs et al. |
| RE31,633 E | 7/1984 | Lewis |
| 4,467,532 A | 8/1984 | Drake |
| 5,343,632 A | 9/1994 | Dinh |
| 5,447,686 A | 9/1995 | Seidner |
| 5,595,000 A | 1/1997 | Goodwin, III |
| 6,865,821 B2 | 3/2005 | Merschat |

*Primary Examiner*—S. Gravini
(74) *Attorney, Agent, or Firm*—Raymond R. Ferrera

(57) ABSTRACT

A lumber drying system includes a drying compartment having an arched roof, a plurality of baffle boxes, wherein each baffle box further includes a main chamber, an air intake that forms an entrance into the chamber, an air outtake that forms an exit from the chamber, a plurality of interleaved plates disposed within the chamber between the air intake and the air outtake, and a water outlet disposed beneath and in communication with the plurality of interleaved plates. The plurality of baffle boxes are distributed on the sides of the roof, each air intake of the baffle boxes being in communication with an upper portion of the drying compartment. The disclosed lumber drying system further includes a plurality of air collection chambers distributed on the roof, wherein each air collection chamber has an air inlet and a water outlet, and wherein each air inlet of the air collection chambers is disposed in communication with at least one of the air outtakes of the plurality of baffle boxes, a water collection tank having at least one water input disposed in communication with at least one water outlet of the plurality of baffle boxes, and at least one water input of the water collection tank disposed in communication with at least one water output of said air collection chambers. Alternatively, a condensation baffle is located beneath the plurality of baffle boxes, above the lumber, thereby shielding the lumber from falling condensation. Further, one or more of the baffle boxes may also include an entrance condenser plate disposed at the air intake of the baffle box. In addition, water expelled from at least one of the water outlets may be routed back to a boiler. At least one air collection chamber further includes an air outlet disposed in communication with the drying compartment. At least one of the air collection chambers further includes an air outlet disposed in communication with a boiler, which in turn directs heated air back toward the drying compartment.

13 Claims, 2 Drawing Sheets

DRY KILN HEAT RETENTION SYSTEM

STATEMENT OF RELATED CASES

This application claims the benefit of U.S. Provisional Application No. 60/656,011, filed Feb. 24, 2005.

FIELD OF THE INVENTION

The present invention relates generally to methods and means for drying materials in a kiln and, in a particular though non-limiting embodiment, to a system and method of using a closed-system approach to drying lumber.

BACKGROUND OF THE INVENTION

In an ordinary dry kiln system, relatively dry outside air is vented into the kiln and then heated. Often, a boiler is used to heat the air. The heated air is then passed over an assemblage of space-stacked lumber. Moisture from the lumber evaporates into the heated air, thereby lowering the moisture content of the lumber. The heated air then contains the released moisture, typically in the form of steam. Finally, the moisture-laden air is directed out of the kiln. This configuration is sometimes called an open system, because fresh dry outside air is continuously applied to the system, while moisture-laden air generated within the kiln is exhausted from the system.

Open systems, however, require significant amounts of energy to heat the fresh outside air, since energy is necessarily lost along with the exhausted moisture-laden air. Those of skill in the art will appreciate that a more closed system approach might be possible if moisture can be economically removed from the air and returned to the kiln. Further, recovered moisture, being relatively pure, may be used for other purposes, such as replenishing a supply of boiler water.

SUMMARY OF THE INVENTION

A system for drying lumber is provided, wherein the system includes a drying compartment, a means for heating and transferring heated air to the drying compartment, and a baffling means for collecting water from the air. The baffling means includes a main chamber, an air intake that forms an entrance into the chamber, an air outtake that forms an exit from the chamber, a plurality of interleaved plates disposed within the chamber between the air intake the air outtake, and a water outlet means for expelling water condensed from the plurality of interleaved plates. The system for drying lumber further includes a directing means for directing air from the drying compartment to the air intake of the baffling means, a water collection means for collecting the expelled water from the water outlet means of the baffling means, and an air collection means for collecting air from the air outtake of the baffling means. A condensation baffle may be located beneath the baffling means, above the lumber, shielding the lumber from falling condensation. The expelled water from the water outlet means may be provided to the air heating means. The collected air from the air outtake of the baffling means may be provided to the drying compartment as entrance air. An airflow restriction means may be used to limit external air from entering the system.

Also provided is an apparatus for drying lumber, wherein the apparatus includes a drying compartment, a boiler disposed in communication with the drying compartment, wherein the boiler provides heated air to the drying compartment, and a baffle box. The baffle box further includes a main chamber, an air intake that forms an entrance into the chamber, an air outtake that forms an exit from the chamber, a plurality of interleaved plates disposed within the chamber between the air intake and the air outtake, and a water outlet disposed beneath and in communication with the plurality of interleaved plates. The apparatus for drying lumber further includes a water collection tank in communication with the water outlet of the baffle box, whereby expelled water from the water outlet of the baffle box is received, and an air collection box in communication with the air outtake of the baffle box, whereby expelled air from the air outtake of the baffle box is received. A condensation baffle may be installed beneath the baffle box, above the lumber, thereby shielding the lumber from falling condensation. Water expelled from the water outlet may also be provided to the boiler. The collected air from the air outtake of the baffle box may also be provided to the drying compartment as entrance air.

Further provided is a lumber drying system including a drying compartment having an arched roof, a plurality of baffle boxes, wherein each baffle box further includes a main chamber, an air intake that forms an entrance into the chamber, an air outtake that forms an exit from the chamber, a plurality of interleaved plates disposed within the chamber between the air intake and the air outtake, and a water outlet disposed beneath and in communication with the plurality of interleaved plates. The plurality of baffle boxes are distributed on the sides of the roof, with each air intake of the baffle boxes being disposed in communication with an upper portion of the drying compartment. The lumber drying system further includes a plurality of air collection chambers distributed on the roof, each chamber having an air inlet and a water outlet, with each air inlet of the air collection chambers being disposed in communication with at least one of the air outtakes of the plurality of baffle boxes, a water collection tank having at least one water input disposed in communication with at least one water outlet of the plurality of baffle boxes, and at least one water input of the water collection tank disposed in communication with at least one water output of the air collection chambers. A condensation baffle may be located beneath the plurality of baffle boxes, above the lumber, shielding the lumber from falling condensation. One or more of the baffle boxes may further include an entrance condenser plate at the air intake of the baffle box. The expelled water from at least one water outlet may also be provided to a boiler. At least one air collection chamber may further include an air outlet disposed in communication with the drying compartment. Finally, at least one of the air collection chambers may also include an air outlet disposed in communication with a boiler, wherein the boiler provides heated air to the drying compartment.

Further provided is a process for drying lumber including the steps of: placing lumber into a drying compartment, heating air inside the drying compartment using a boiler, collecting water condensation from the baffle box, transferring the collected water condensate to the boiler, collecting air from the baffle box, and then providing the collected air to the boiler as well.

BRIEF DESCRIPTION OF THE SEVERAL DRAWINGS

DETAILED DESCRIPTION

Figure 1:
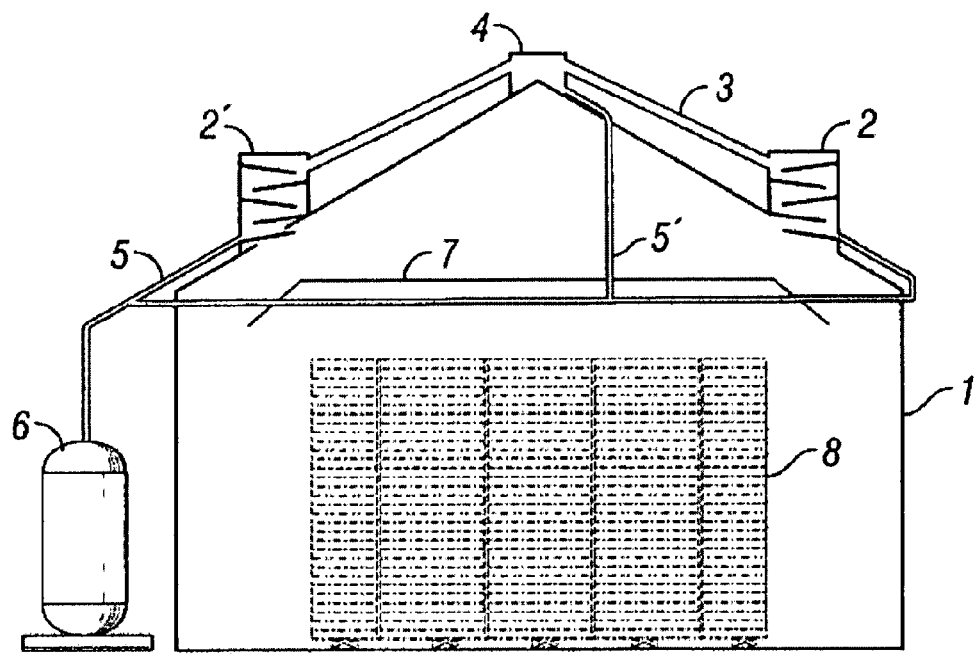
FIG. 1 is a side view of a representative system according to the invention for drying lumber of the present invention, including a side view of the baffle boxes 2.
Figure 2A:
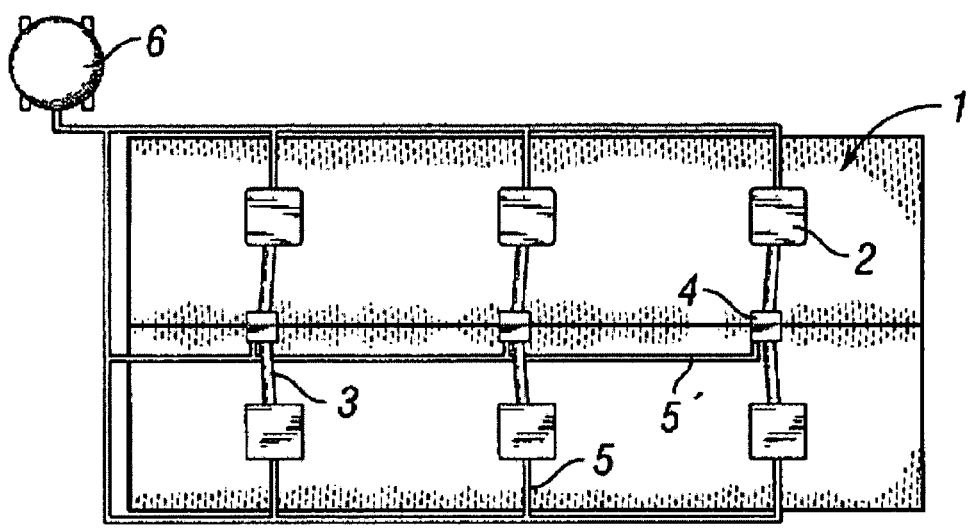
FIGS. 2A, 2B are a top view of the system for drying lumber, including a top view of the baffle boxes 2.
Figure 2B:
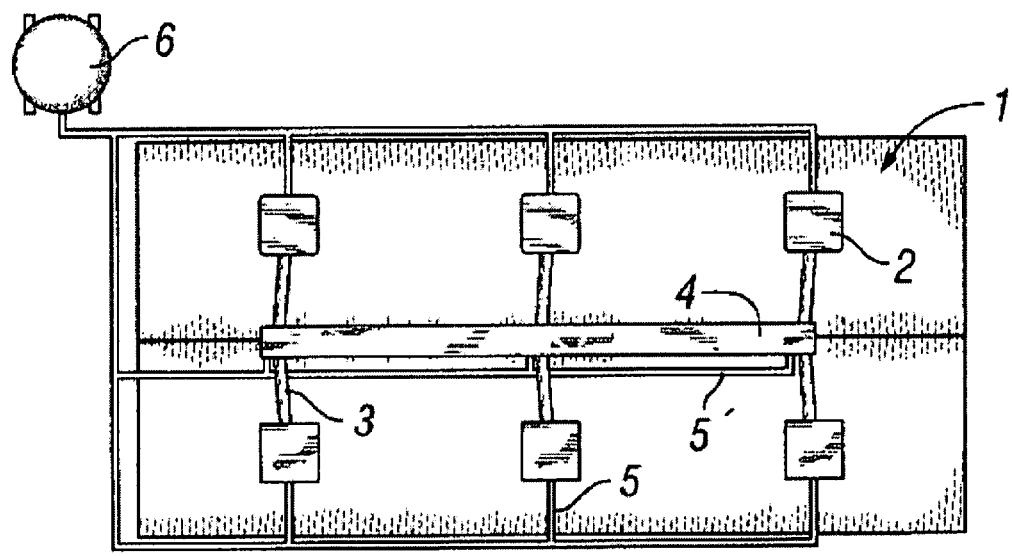
Figure 3:
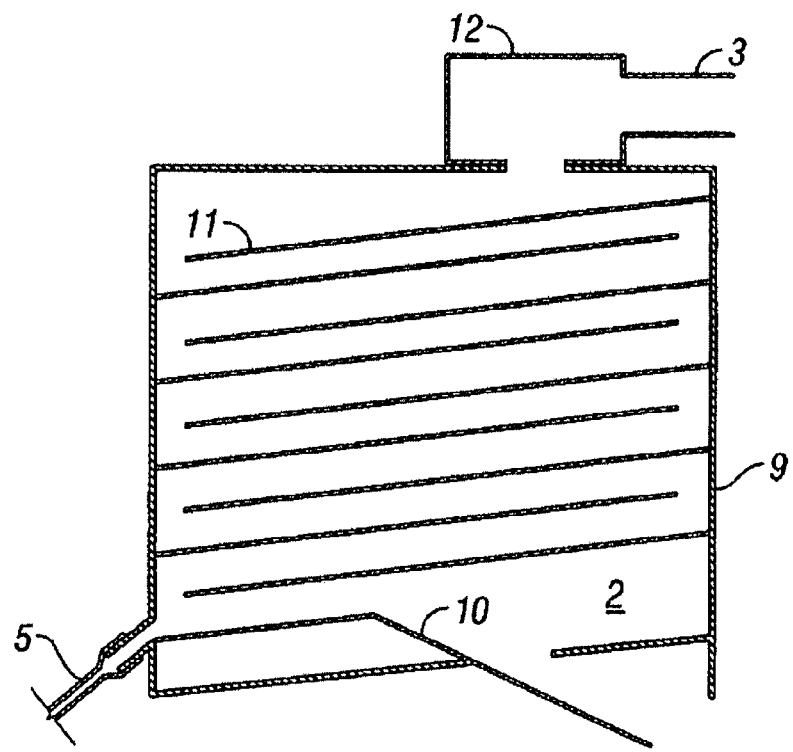
FIG. 3 is a side view of a baffle box 2 according to the invention.

Each of FIGS. 1-3 illustrates a lumber drying system embodying various aspects of the present invention, though these particular embodiments are illustrated and described herein only for exemplary purposes. Moreover, variations of the lumber drying system and methods of utilizing the same will become apparent to those of ordinary skill in the relevant structural and mechanical arts upon reading the following disclosure. Thus, the present invention is not to be considered limited to only the structures, systems, and methods described herein.

FIG. 1 illustrates a side view of the system for drying lumber according to the invention. Kiln building 1 is a drying compartment, shown in this particular embodiment as having an arched roof. An air heating means (not illustrated), such as a boiler, provides heated air to kiln building 1. A condenser system and baffle boxes 2, 2' are placed in the arched roof of kiln building 1. Baffle boxes 2, 2' represent one embodiment of a baffling means. In a presently preferred embodiment, baffle boxes 2, 2' are located in an upper portion of kiln building 1, thereby allowing the recapture of rising, relatively warmer, heated air. One end of baffle boxes 2, 2' are disposed in communication with the interior of kiln building 1, thereby forming an air intake entrance to baffle boxes 2, 2'. Another end of baffle boxes 2, 2' are connected to one end of ductwork 3, thereby forming an air outtake exit from baffle boxes 2, 2'. Ductwork 3 connects to one or more air collection boxes 4. Air collection boxes 4 represent one embodiment of an air collection means. One end of water return lines 5 connect a condensation pooling area of baffle boxes 2, 2', providing a water outlet means used to expel condensation from baffle boxes 2, 2'. Another end of water return lines 5 connect to water collection reservoir 6, thereby providing a means to collect the relatively pure condensation water for later use. Water collection reservoir 6 may be a water tank or any other similar collection means.

In an alternative embodiment, the relatively pure water derived from condensation is provided to the boiler in order to replenish boiler water lost in the course of operations. Water return lines 5' connect a condensation pooling area of air collection boxes 5 to water collection reservoir 6, either by means of direct connection, or instead by communication with water return lines 5. In another alternative embodiment, a condensation baffle 7 is suspended in an upper portion of kiln building 1 in order to reduce the amount of condensation that would otherwise fall on the material to be dried, represented here as lumber 8.

In another embodiment, condensation baffle 7 is dimensioned such that approximately eighty percent of the linear distance across kiln building 1 is covered by condensation baffle 7. The remaining ten percent along the perimeter side walls of kiln building 1 provides an airy communication between the upper portion of kiln building 1, which contains baffles 2, 2', and a lower portion of kiln building 1, which generally contains the material to be dried, such as lumber 8.

In a further embodiment, air collected from air collection boxes 4 is returned to kiln building 1 to be used as entrance air for drying stored materials. Typically, a boiler or other heating means first heats the entrance air. In operation, recycling of the air collected from air collection boxes 4 reduces the amount of fresh external air needed from outside kiln building 1. A restriction means, such as a damper (not illustrated) can be used to regulate or limit the intake of fresh external air, thereby creating a relatively closed system. Optimally, the relatively closed system will reduce the amount of energy required to complete drying operations within the kiln.

FIG. 2 illustrates a top view of the system for drying lumber according to the invention. The roof of kiln building 1 is shown. Baffle boxes 2 are shown positioned on the sides of the roof of kiln building 1. In a presently preferred embodiment, one or more baffle boxes 2 are positioned approximately midway up each side of the roof of kiln building 1. A plurality of baffle boxes 2 is proportionally positioned across the length of the roof. As illustrated in FIG. 2, three pairs of baffle boxes 2 are shown, each shown distributed at approximately equal distances across the roof of kiln building 1. Ductwork 3 connects each baffle box 2 to at least one of a plurality of air collection boxes 4. Air collection boxes 4 are proportionally positioned along the ridge of the roof of kiln building 1. Water return lines 5 connect each of the plurality of baffle boxes 2 to water collection reservoir 6. Water return lines 5' connect each of the plurality of air collection boxes 4 to water collection reservoir 6.

FIG. 3 illustrates a side view of an example embodiment of a baffling means suitable for use with the present invention. Baffle box 2 is equipped with a main chamber 9. Chamber 9 is typically a closed box having at least one air intake located in the bottom of the box, and at least one air outtake located in the top of the box. In a presently preferred embodiment, chamber 9 is made of stainless steel. In an alternate embodiment, an entrance condenser plate 10 is disposed in communication with an opening formed in the bottom of chamber 9, thereby providing a means to direct air into chamber 9. A plurality of condenser plates 11 is interleaved within chamber 9, thereby forming a tortuous path for air disposed between the air intake at the bottom of the chamber 9 and the air outtake at the top of the chamber. Condenser plates 11 are typically angled to allow condensed water to flow downwards towards a condensation pooling area located near the bottom of chamber 9. In the preferred embodiment, condenser plates 11 are formed from a stainless steel, and then welded or otherwise affixed to the walls of chamber 9. Water return lines 5 connect near the bottom of chamber 9 to receive the collected condensation water. Condenser plates may have gaps or holes at the lower ends (not illustrated) to facilitate drainage of condensed water towards water return lines 5, which is located near the bottom of chamber 9. A receiving chamber 12 connects an opening at the top of chamber 9 to one end of ductwork 3.

In a still further embodiment, a directing means is used to direct heated air into the opening at the bottom of chamber 9. Such means can comprise a fan or even additional ductwork connected to the air intake of chamber 9 (not illustrated), so long as the configuration serves to direct the heated air.

In operation, the material to be dried, for example, lumber 8 (as shown in FIG. 1) is placed in the drying compartment, illustrated as kiln building 1. A boiler or other heating means is used to heat the air inside kiln building 1. The heated air absorbs moisture from lumber 8 and then rises into baffle boxes 2. Water condensate is collected from baffle boxes 2 and provided to a boiler as replenishment boiler water. Air collection boxes 4 collect the relatively drier air from baffle boxes 2. The relatively drier air is collected from air collection boxes 4 and then provided to a boiler or another heating means and is used to further heat the air inside kiln building 1. Those of ordinary skill in the art will appreciate that efficiency is realized by using additional passive baffles 2 for the purpose of dehumidification. Such passive dehumidification also minimizes overdrying of the air, thereby reducing the need to humidify entrance air.

The foregoing description is presented for purposes of illustration and description, and is not intended to limit the invention to the forms disclosed herein. Consequently, variations and modifications commensurate with the above teachings and the teaching of the relevant art are deemed to reside within the spirit and scope of the invention as claimed and described.

What is claimed is:

1. A system for drying lumber, the system comprising:
    a drying compartment, wherein said lumber is placed within the drying compartment;
    an air heating means for providing heated air to said drying compartment;
    a baffling means contained within said drying compartment for collecting water from the air, wherein said baffling means further comprises:
        a main chamber;
        an air intake that forms both an exit from said drying compartment and an entrance into said chamber;
        an air outtake that forms an exit from said chamber;
        a plurality of interleaved plates disposed within said chamber between said air intake and said air outtake; and
        a water outlet means for expelling water condensed from said plurality of interleaved plates;
    a directing means for directing air from said drying compartment to said air intake of said baffling means;
    a water collection means for collecting said expelled water from said water outlet means of said baffling means; and
    an air collection means for collecting air from said air outtake of said baffling means.

2. The system of claim 1, further comprising a condensation baffle disposed within said drying compartment, wherein said condensation baffle is generally located beneath said baffling means and above the lumber, so that said condensation baffle shields the lumber from falling condensation.

3. The condensation baffle of claim 2, wherein said condensation baffle is disposed within said drying compartment in a manner such that approximately eighty percent of at least one linear dimension of said drying compartment is disposed in communication with said condensation baffle.

4. The system of claim 1, wherein said main chamber of said baffling means comprises a stainless steel box.

5. The system of claim 1, wherein said directing means comprises a baffling means disposed generally above said drying compartment, thereby allowing warmer air to rise into said air intake of said baffling means.

6. The system of claim 1, wherein said directing means further comprises an entrance condenser plate provided to guide heated air into said air intake of said baffling means.

7. The system of claim 1, wherein said directing means further comprises an air guiding means for guiding heated air into said air intake of said baffling means.

8. The system of claim 7, wherein said air guiding means further comprises a fan for guiding heated air into said air intake of said baffling means.

9. The system of claim 1, wherein water expelled from said water outlet means is provided to said air heating means.

10. The system of claim 1, wherein air collected from said air outtake of said baffling means is provided to said drying compartment as entrance air.

11. The system of claim 1, wherein air collected from said air outtake of said baffling means is provided to said air heating means.

12. The system of claim 1, wherein said plurality of interleaved plates are formed from stainless steel.

13. The system of claim 1, further comprising an airflow restriction for restricting the introduction of external air into the system.

* * * * *